United States Patent
Koshimizu et al.

(10) Patent No.: US 7,088,477 B2
(45) Date of Patent: Aug. 8, 2006

(54) IMAGE READING APPARATUS AND ILLUMINATION APPARATUS

(75) Inventors: Masato Koshimizu, Kanagawa (JP); Tsutomu Takayama, Kanagawa (JP); Mitsugu Hanabusa, Tokyo (JP); Kengo Kinumura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 10/099,717

(22) Filed: Mar. 13, 2002

(65) Prior Publication Data

US 2002/0131094 A1 Sep. 19, 2002

(30) Foreign Application Priority Data

Mar. 15, 2001 (JP) ............................. 2001-074326
Mar. 15, 2001 (JP) ............................. 2001-074327

(51) Int. Cl.
*H04N 1/04* (2006.01)
*H04N 1/46* (2006.01)

(52) U.S. Cl. ...................... 358/487; 358/475; 358/484; 358/506

(58) Field of Classification Search ................ 358/487, 358/475, 484, 509, 506, 497, 494, 474, 505, 358/463; 382/318, 319, 312, 141, 275; 250/208.1, 250/234–236, 559.42, 559.45; 355/67, 70, 355/37, 41; 399/220, 219
See application file for complete search history.

(56) References Cited

U.S. PATENT DOCUMENTS

| | | | |
|---|---|---|---|
| 5,038,227 A | 8/1991 | Koshiyouji et al. | 358/471 |
| 5,359,691 A | 10/1994 | Tai et al. | 385/146 |
| 5,667,289 A | 9/1997 | Akahane et al. | 362/31 |
| 5,695,269 A | 12/1997 | Lippmann et al. | 362/27 |
| 5,969,372 A * | 10/1999 | Stavely et al. | 250/559.42 |
| 6,323,967 B1 * | 11/2001 | Fujinawa | 358/484 |
| 6,437,358 B1 * | 8/2002 | Potucek et al. | 250/559.45 |
| 6,474,836 B1 * | 11/2002 | Konagaya | 362/231 |
| 6,493,061 B1 * | 12/2002 | Arita et al. | 355/41 |
| 6,532,085 B1 * | 3/2003 | Fujinawa | 358/475 |
| 6,660,987 B1 * | 12/2003 | Koshimizu | 250/208.1 |
| 6,734,997 B1 * | 5/2004 | Lin | 358/487 |

(Continued)

FOREIGN PATENT DOCUMENTS

EP        0 510 421 A2    10/1992

(Continued)

OTHER PUBLICATIONS

European Search Report dated Jul. 1, 2002.

*Primary Examiner*—Cheukfan Lee
(74) *Attorney, Agent, or Firm*—Morgan & Finnegan, LLP

(57) ABSTRACT

This invention has an object of reading a high-quality image by detecting and correcting dust or scratches present on a transparent original in an image reading apparatus for reading, e.g., a transparent original. To achieve this object, an original illumination unit in the image reading apparatus for reading an original includes at least a first light source for emitting light in a visible region, a second light source for emitting light in a n invisible region, and a light guide plate which has these light sources arranged at end faces and has first and second light guide patterns for guiding light beams from the first and second light sources to the entire light-emitting surface.

23 Claims, 13 Drawing Sheets

U.S. PATENT DOCUMENTS

| | | | |
|---|---|---|---|
| 6,765,701 B1 * | 7/2004 | Yang et al. | 358/487 |
| 6,791,721 B1 * | 9/2004 | Konogaya et al. | 358/474 |
| 6,796,502 B1 * | 9/2004 | Nogami et al. | 235/454 |
| 6,806,981 B1 * | 10/2004 | Konno | 358/505 |
| 2001/0030278 A1 | 10/2001 | Koshimizu | |
| 2002/0168116 A1 * | 11/2002 | Takayama et al. | 382/275 |

FOREIGN PATENT DOCUMENTS

| | | |
|---|---|---|
| EP | 1 076 205 A1 | 2/2001 |
| JP | 08307608 | 11/1996 |
| JP | 10126578 | 5/1998 |
| WO | WO 98/34397 | 8/1998 |

\* cited by examiner

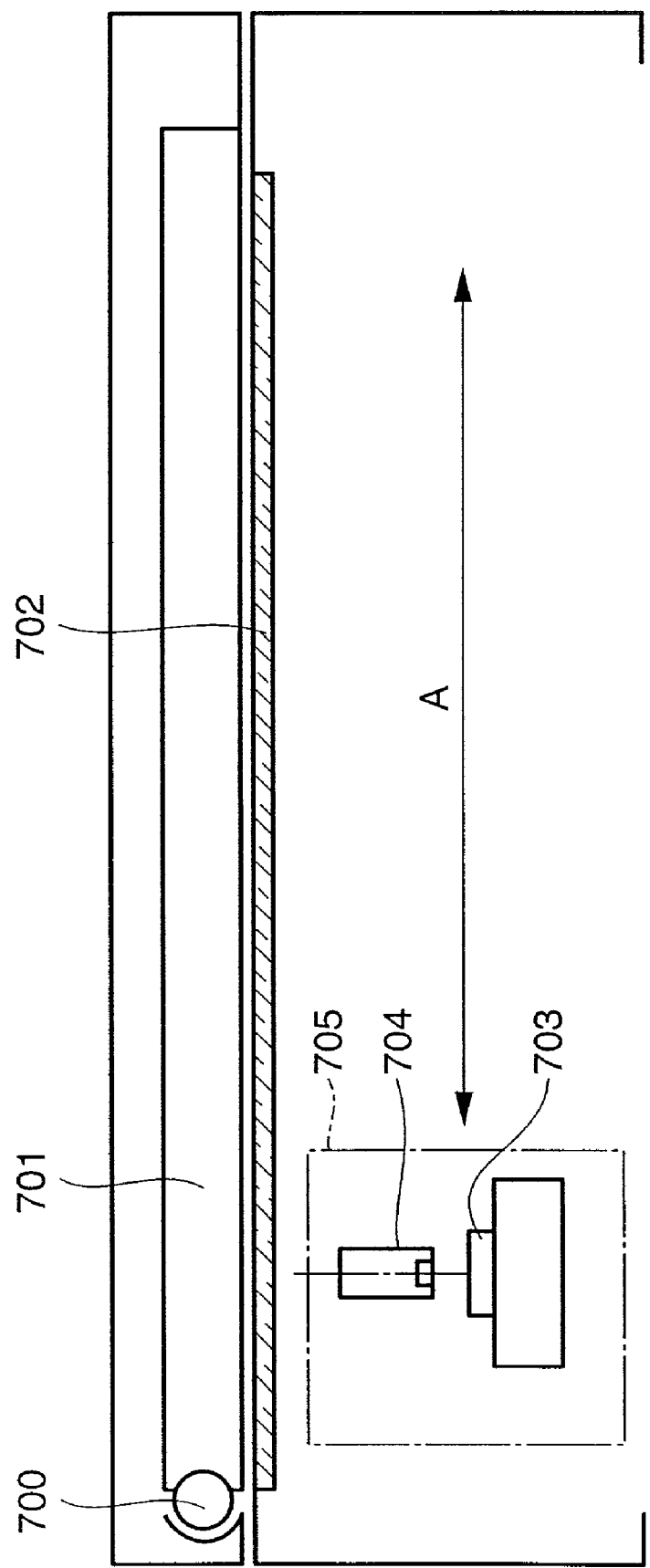

IMAGE READING APPARATUS AND ILLUMINATION APPARATUS

FIELD OF THE INVENTION

The present invention relates to an image reading apparatus for reading image information of an original and an illumination apparatus used in the image reading apparatus.

BACKGROUND OF THE INVENTION

There is conventionally known an image reading apparatus for illuminating a transparent original and reading its image, as disclosed in U.S. Pat. No. 5,038,227. The conventional image reading apparatus will be described with reference to FIGS. 1A and 1B.

FIG. 1A is a sectional view showing an image reading apparatus, and FIG. 1B is a perspective view. A bar-like fluorescent tube 700 is attached to the end of a light guide plate 701 which is arranged in parallel to a platen glass 702 for setting an original. The light guide plate 701 is a resin light diffusion panel for diffusing light emitted by the fluorescent tube 700 and emitting the light from the surface.

The platen glass 702 is an original table for setting a transparent original such as a photographic film. A transparent original set on the platen glass 702 is sandwiched and fixed between the light guide plate 701 and the platen glass 702. A CCD 703 is a linear imaging element for converting image information into an electric image signal. An imaging optical system 704 optically guides the image information of the transparent original to the CCD 703.

A carriage 705 supports the CCD 703 and imaging optical system 704, and is movable in the subscanning direction along guides 706 and 707. When the entire surface of a transparent original is illuminated by the light guide plate 701, image information of the transparent original is read by the CCD 703 via the imaging optical system 704. The carriage 705 is moved in the subscanning direction to sequentially read the image of the entire transparent original.

If, however, dirt such as dust exists on a transparent original or an original is scratched, the conventional image reading apparatus reads even the dirt or scratch, so the image degrades owing to the dirt or scratch.

SUMMARY OF THE INVENTION

The present invention has been made to solve the above problem, and has as its object to obtain a high-efficiency surface illumination apparatus and attain a high-quality read image from which dust or scratches are effectively removed in an image reading apparatus using the surface light source.

To solve the above problem and achieve the above object, an image reading apparatus according to the first aspect of the present invention has the following arrangement.

More specifically, an image reading apparatus comprises a first light source for emitting light in a visible region, a second light source for emitting light in an invisible region, a light guide plate which has the first and second light sources arranged at end faces, and has a first light guide pattern for guiding light emitted by the first light source to an entire light-emitting surface and a second light guide pattern for guiding light emitted by the second light source to the entire light-emitting surface, and reading means for converting light from an original illuminated by light which is emitted by the first or second light source and guided by the light guide plate into an image signal.

An illumination apparatus according to the first aspect of the present invention has the following arrangement.

More specifically, an illumination apparatus comprises a first light source for emitting light in a visible region, a second light source for emitting light in an invisible region, and a light guide plate which has the first and second light sources arranged at end faces, and has a first light guide pattern for guiding light emitted by the first light source to an entire light-emitting surface and a second light guide pattern for guiding light emitted by the second light source to the entire light-emitting surface.

An image reading apparatus according to the second aspect of the present invention has the following arrangement.

More specifically, an image reading apparatus comprises a first light source for emitting light in a visible region, a second light source constituted by aligning on a light-emitting element substrate a plurality of light-emitting elements for emitting light in an invisible region, a light guide plate for guiding light beams emitted by the first and second light sources through a surface to illuminate an original, and reading means for converting light from the original illuminated by light which is emitted by the first or second light source and guided by the light guide plate into an image signal.

An illumination apparatus according to the second aspect of the present invention has the following arrangement.

More specifically, an illumination apparatus comprises a first light source for emitting light in a visible region, a second light source constituted by aligning on a light-emitting element substrate a plurality of light-emitting elements for emitting light in an invisible region, and a light guide plate which has the first and second light sources arranged at end faces, and guides incident light beams from the end faces through a surface to substantially uniformly emit light.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1A and 1B are a schematic sectional view and perspective view, respectively, showing a conventional image reading apparatus;

DETAILED DESCRIPTION OF THE PREFERRED EMBODIMENTS

Preferred embodiments of the present invention will be described in detail below with reference to the accompanying drawings.

(First Embodiment)

An image reading apparatus in the first embodiment of the present invention will be described with reference to FIGS. 2 to 6.

Figure 1B:
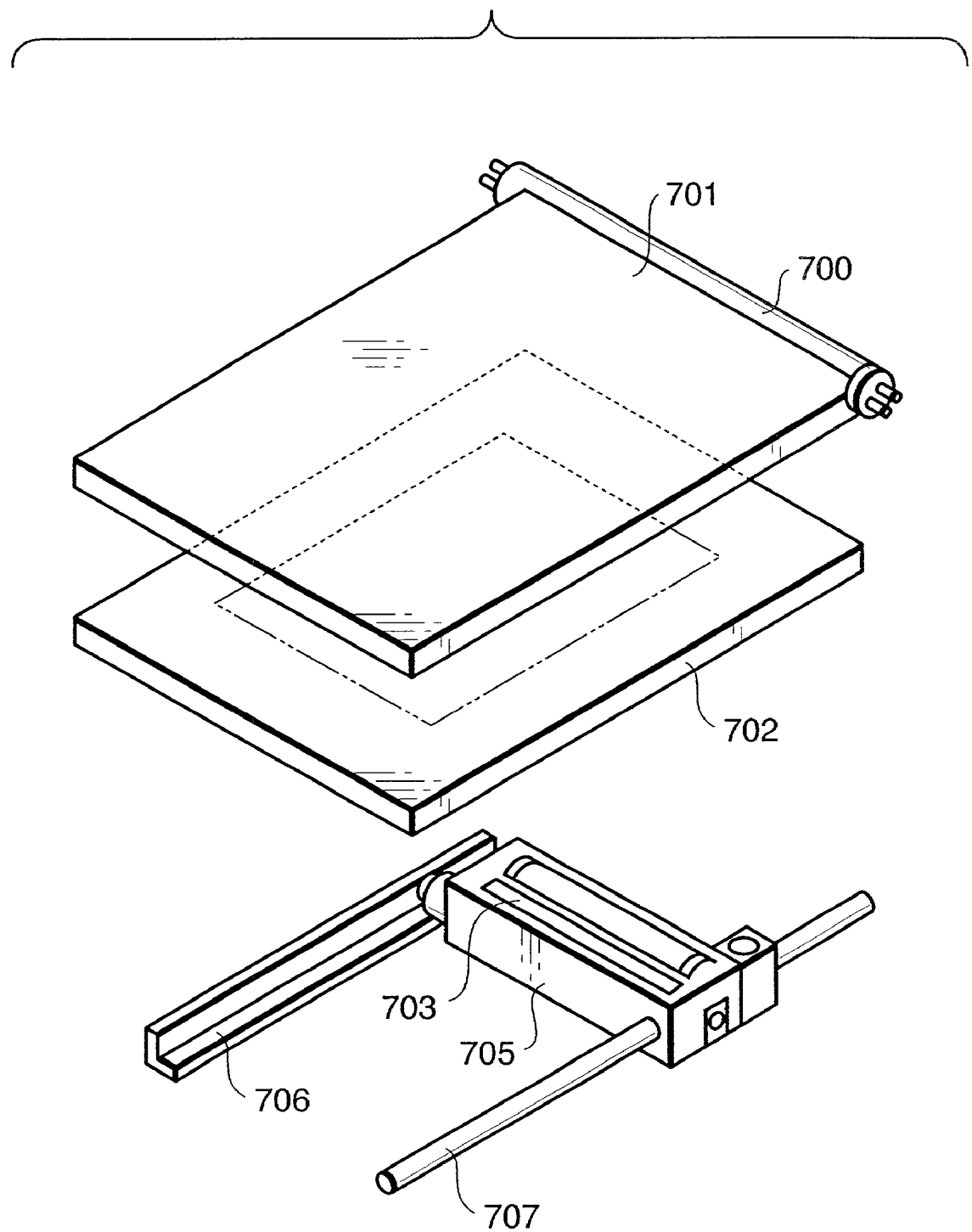
Figure 2:
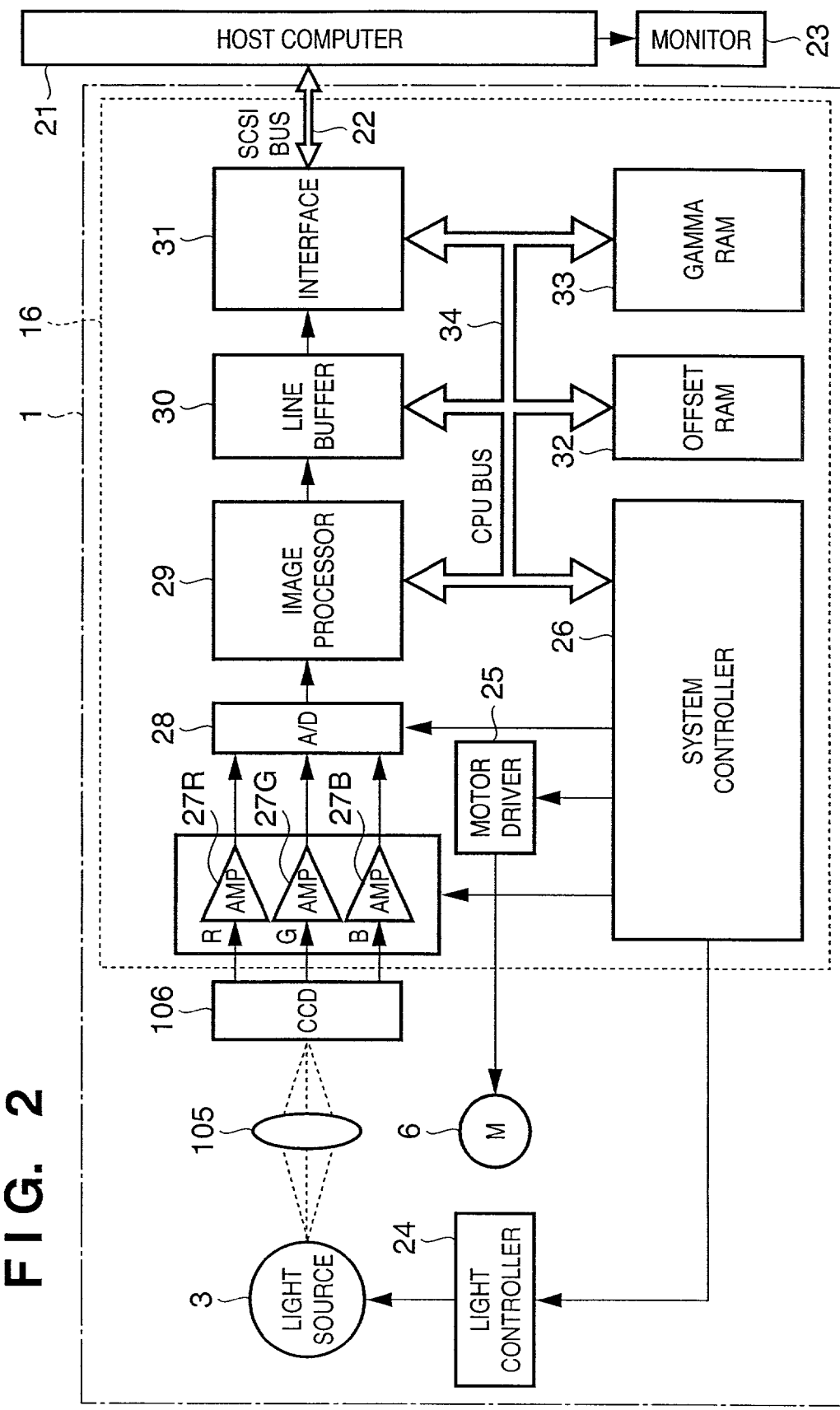
FIG. 2 is a block diagram showing the arrangement of an image reading apparatus according to the first embodiment.

FIG. 2 is a block diagram showing the internal arrangement of the image reading apparatus according to the first embodiment. Respective functional blocks will be explained with reference to FIG. 2. An image reading apparatus 1 is connected to a host computer 21 via a signal cable. The image reading apparatus 1 operates to read an image in accordance with an instruction from the host computer 21, and transfers the image signal to the host computer 21.

Reference numeral 105 denotes an imaging lens for forming light from an original irradiated by a light source 3 into an image on a CCD 106 serving as a solid-state image sensing element; and 24, a light controller for turning on the light source 3. Note that the image sensing element may be a CMOS or the like other than the CCD. On an electric board 16, reference numeral 25 denotes a motor driver for driving a pulse motor 6 and outputting an excitation switching signal for the pulse motor 6 upon reception of a signal from a system controller 26 serving as the system control means of the image reading apparatus (image scanner) 1; and 27R, 27G, and 27B, analog gain adjusters for variously amplifying analog image signals output from the CCD line sensor 106.

Reference numeral 28 denotes an A/D converter for converting analog image signals output from the analog gain adjusters 27R, 27G, and 27B into digital image signals; 29, an image processor for performing image processing such as offset correction, shading correction, digital gain adjustment, color balance adjustment, masking, resolution conversion in the main scanning and subscanning directions for a digital image signal; and 30, a line buffer which temporarily stores image data and is implemented by a general-purpose random access memory.

Reference numeral 31 denotes an interface for communicating with the host 21. In the first embodiment, the interface 31 is implemented by a SCSI controller but may adopt another interface such as a centronics or USB. Reference numeral 32 denotes an offset RAM used as a working area in image processing. The offset RAM 32 is used to correct offsets between R, G, and B lines because the line sensor 106 is constituted by parallel-arranging R, G, and B line sensors with predetermined offsets. The offset RAM 32 also temporarily stores various data for shading correction and the like. In the first embodiment, the offset RAM 32 is implemented by a general-purpose random access memory.

Reference numeral 33 denotes a gamma RAM for storing a gamma curve for gamma correction. The system controller 26 stores the sequence of the overall scanner as a program, and executes various control processes in accordance with instructions from the host 21. Reference numeral 34 denotes a system bus which connects the system controller 26 to the image processor 29, line buffer 30, interface 31, offset RAM 32, and gamma RAM 33, and is made up of address and data buses.

Figure 3:
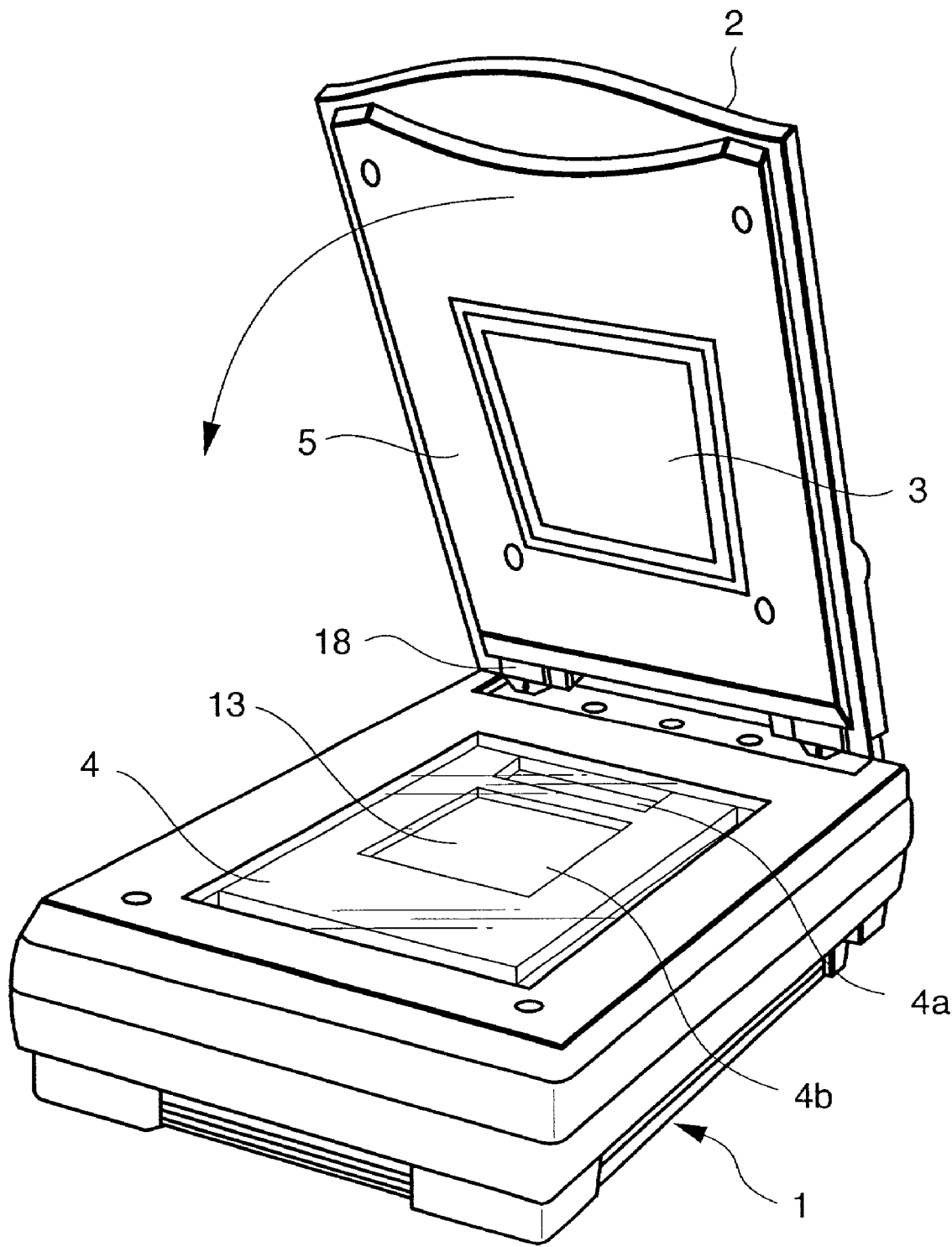
FIG. 3 is a schematic perspective view showing the image reading apparatus according to the first embodiment.

FIG. 3 is a schematic perspective view showing the image reading apparatus according to the first embodiment. As shown in FIG. 3, a transmission illumination unit 2 for illuminating a transparent original in reading the transparent original such as a developed photographic film is pivotally attached to the image reading apparatus 1 via hinges 18. The transmission illumination unit 2 is attached by fixing the surface light source 3 (to be described later) to a lower unit cover 5 with a screw or the like. The surface light source 3 is protected with a transparent member for protecting a light source.

The main body of the image reading apparatus 1 is equipped with a platen glass 13 for setting an original to be read. To read a photographic film, a light-shielding sheet 4 is set on the platen glass 13. A shading window 4a of the light-shielding sheet 4 is to measure shading, and a transparent original setting portion 4b is a location where a transparent original is set.

Figure 4:
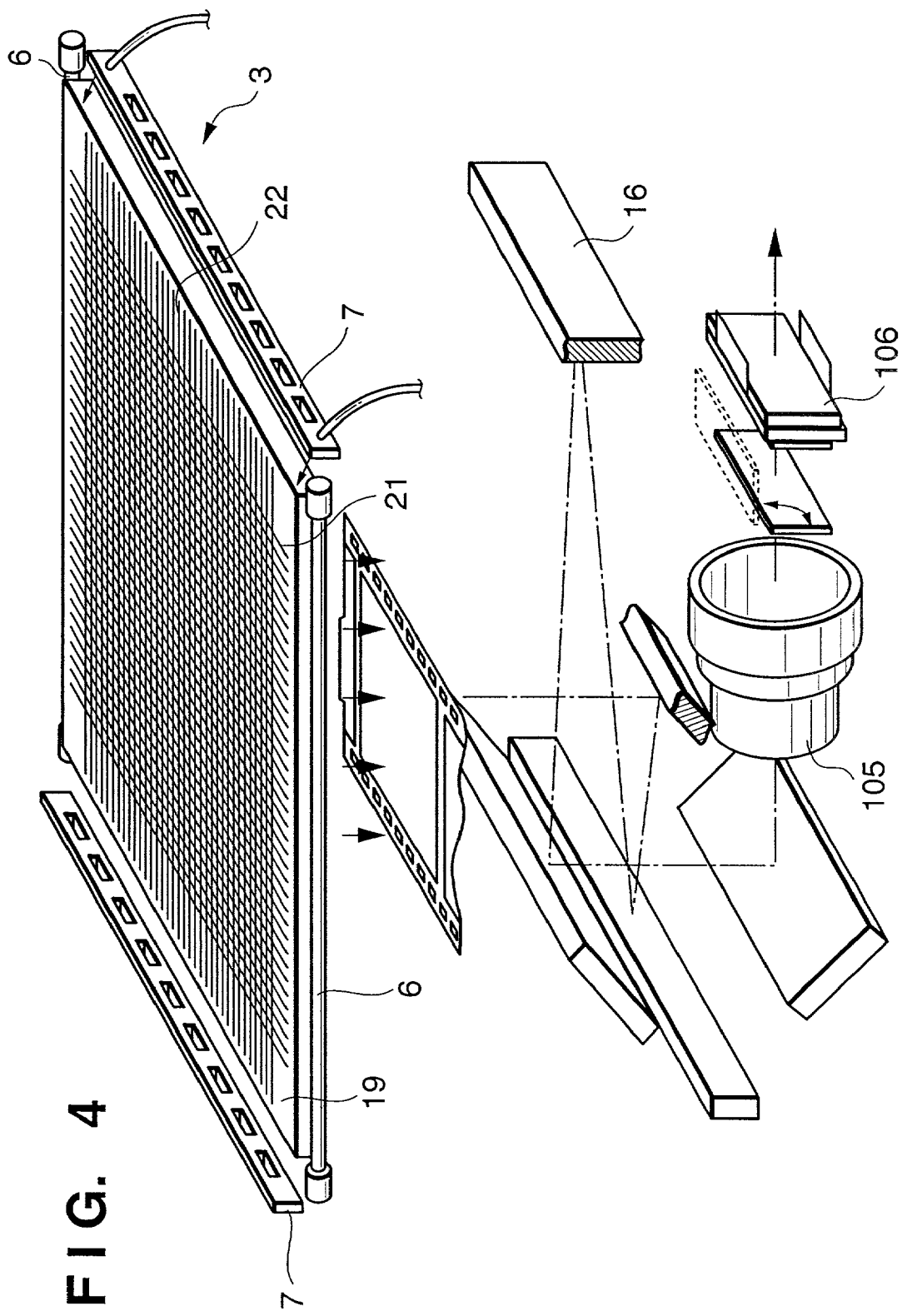
FIG. 4 is a schematic perspective view showing a transmission illumination unit according to the first embodiment.
Figure 5:
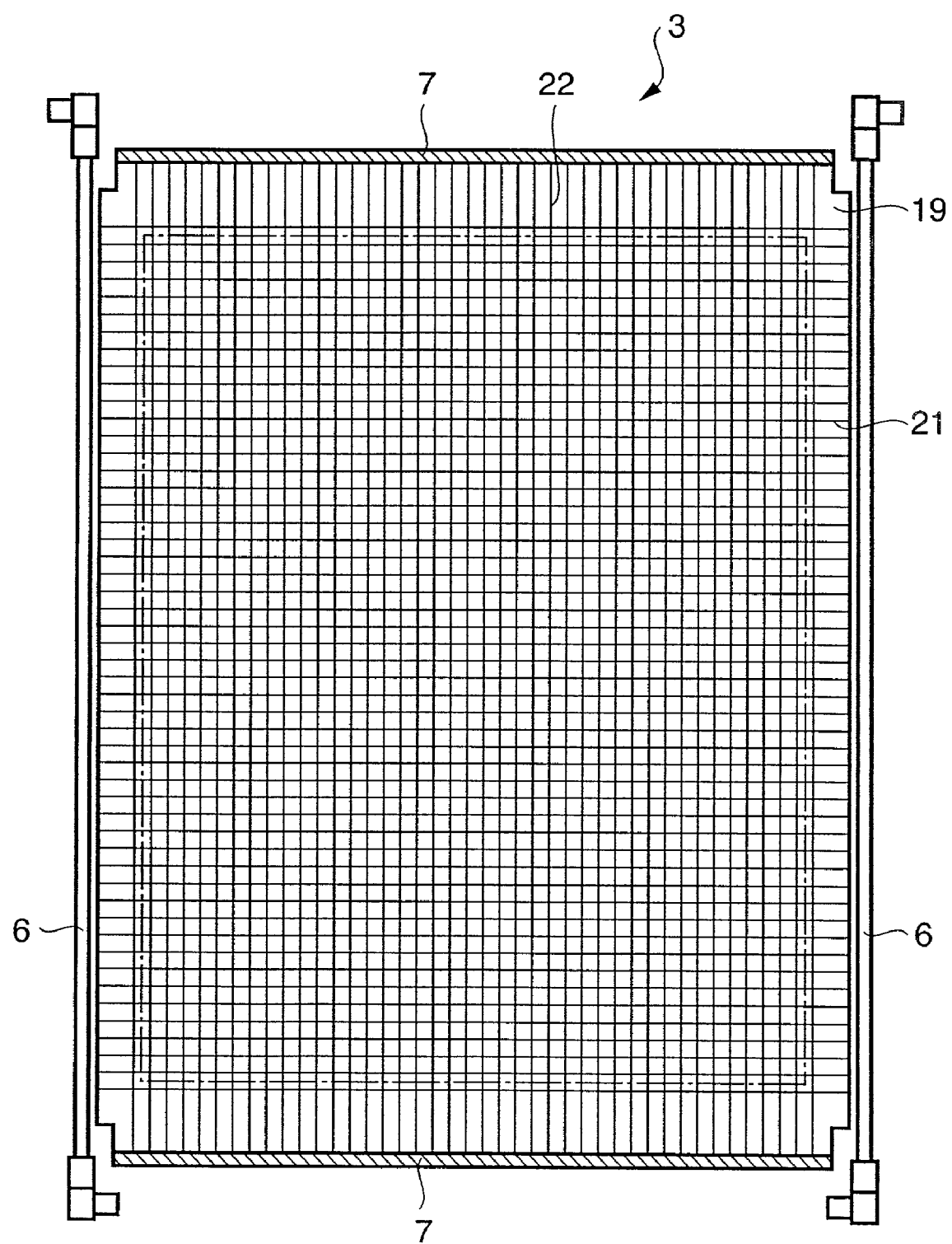
FIG. 5 is a schematic plan view showing the transmission illumination unit according to the first embodiment.
Figure 6:
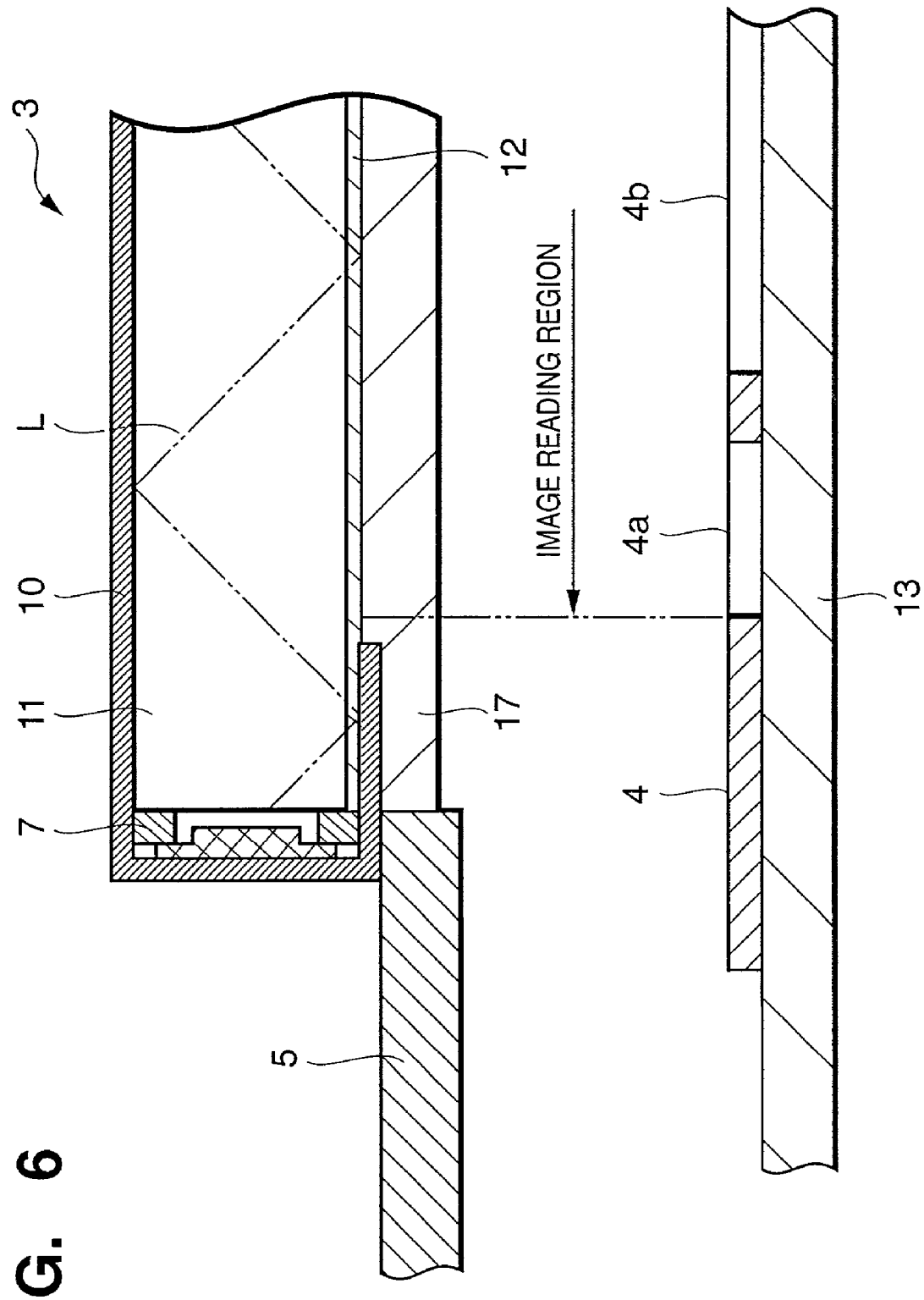
FIG. 6 is a schematic sectional view showing the transmission illumination unit according to the first embodiment.

FIG. 4 is a schematic perspective view showing the transmission illumination unit 2. FIGS. 5 and 6 are a schematic plan view and sectional view, respectively, showing the surface light source 3. The light source 3 is constituted by a light guide plate 19, transparent original reading lamps 6 such as fluorescent tubes or xenon lamps, and dust/scratch detection LED substrates 7 formed from infrared LED chips having an emission intensity in only the infrared region. The transparent original reading lamps 6 and dust/scratch detection LED substrates 7 are arranged on different sides of the light guide plate 19 perpendicular to each other. The transparent original reading lamps 6 are disposed on long sides of the light guide plate 19 so as to improve the surface luminance in the visible region.

The light guide plate 19 is a resin light guide diffusion panel comprised of a first light guide pattern 21 formed on a surface opposite to the light-emitting surface so as to guide light to the entire light-emitting surface by a plurality of grooves extending in a direction perpendicular to the transparent original reading lamp 6, a second light guide pattern 22 formed on a surface opposite to the light-emitting surface so as to guide light to the entire light-emitting surface by a plurality of grooves extending in a direction perpendicular to the dust/scratch detection LED substrate 7, a light guide portion 11 for guiding illumination light L by internal reflection, a reflecting sheet 10 for reflecting in the original direction the light guided by the light guide portion 11, and a diffusion sheet 12 for making the light reflected by the reflecting sheet 10 uniform.

Light L emitted by the transparent original reading lamps 6 and dust/scratch detection LED substrates 7 propagates through the light guide portion 11 in the two-dimensional longitudinal direction while being reflected between the reflecting sheet 10 and the diffusion sheet 12. Part of the light incident on the diffusion sheet 12 diffuses, and the entire surface of the light guide plate 19 emits light.

Figure 7:
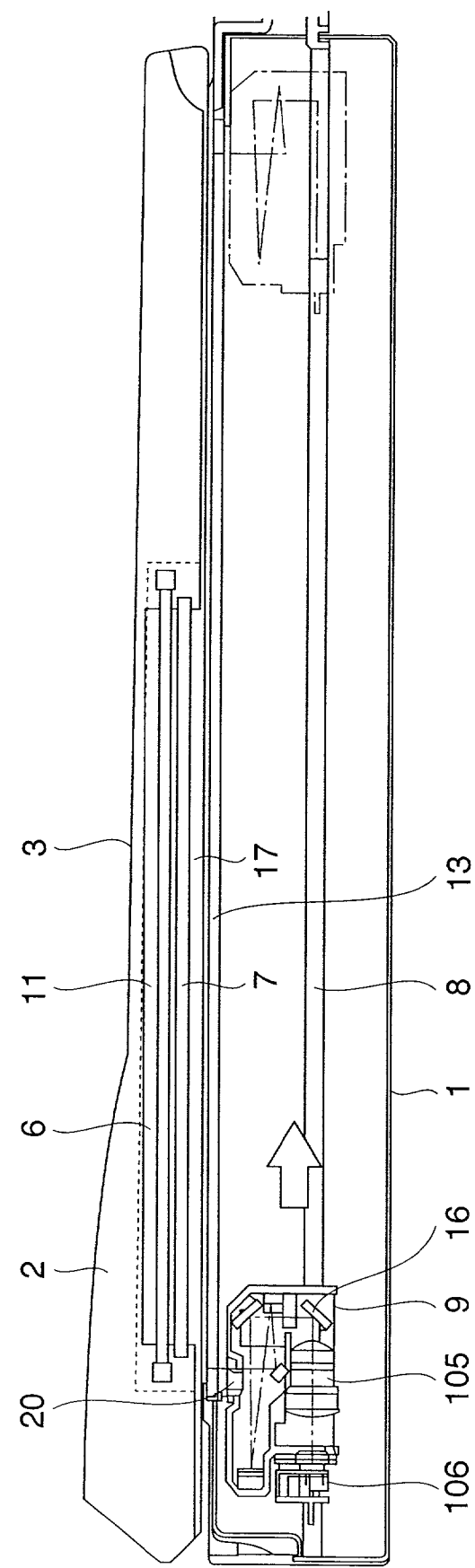
FIG. 7 is a schematic sectional view showing the image reading apparatus according to the first embodiment.

FIG. 7 is a sectional view showing the image reading apparatus according to the first embodiment. The carriage 9 of the image reading apparatus 1 supports a reflecting original illumination lamp 20, the CCD line sensor 106, the lens 105, and a reflecting mirror 16. The CCD line sensor 106 converts an image into an electric image signal and is constituted by a plurality of aligned image sensing elements. The carriage 9 is fit on a carriage guide shaft 8 and is movable in the subscanning direction.

Transparent original reading operation will be described.

The reflecting original illumination lamp 20 and dust/scratch detection LED substrates 7 are turned off, and the transparent original lamps 6 are turned on. Then, the whole surface light source 3 emits light. The carriage 9 is moved in the subscanning direction to project image information on a transparent original onto the CCD 106 via the reflecting mirror 16 and lens 105.

The reflecting original illumination lamp 20 and transparent original illumination lamps 6 are turned off, and the dust/scratch detection LED substrates are turned on. Then, the whole surface light source 3 emits light. The carriage 9 is moved in the subscanning direction to project dust, a scratch, or the like on the transparent original onto the CCD 106 via the reflecting mirror 16 and lens 105. Since light from the dust/scratch detection LED substrate contains only infrared components, the transparent original such as a negative or positive film transmits the infrared components regardless of the image (photosensitive image). An image of dust, a scratch, or the like which physically intercepts the optical path is projected as a shadow on the CCD 106. The dust or scratch can be accurately detected.

Both the dust/scratch detection image and the read image of the transparent original undergo image processing. The defective region having the dust or scratch recognized on the dust/scratch detection image is interpolated from the ambient original-read image. A high-quality transparent original image free from the influence of the dust or scratch can be read.

Although the invisible light source emits infrared rays in the above description, the use of ultraviolet rays enables processing an image in the ultraviolet region. A transparent original such as a film has been exemplified as an original. The present invention can also be applied to a reflecting original.

As described above, the first embodiment can provide a surface illumination apparatus with high emission efficiency. The image reading apparatus using the surface light source can attain a high-quality read image from which dust or scratches are effectively removed.

(Second Embodiment)

An image reading apparatus in the second embodiment of the present invention will be described with reference to FIGS. 8 to 12.

Figure 8:
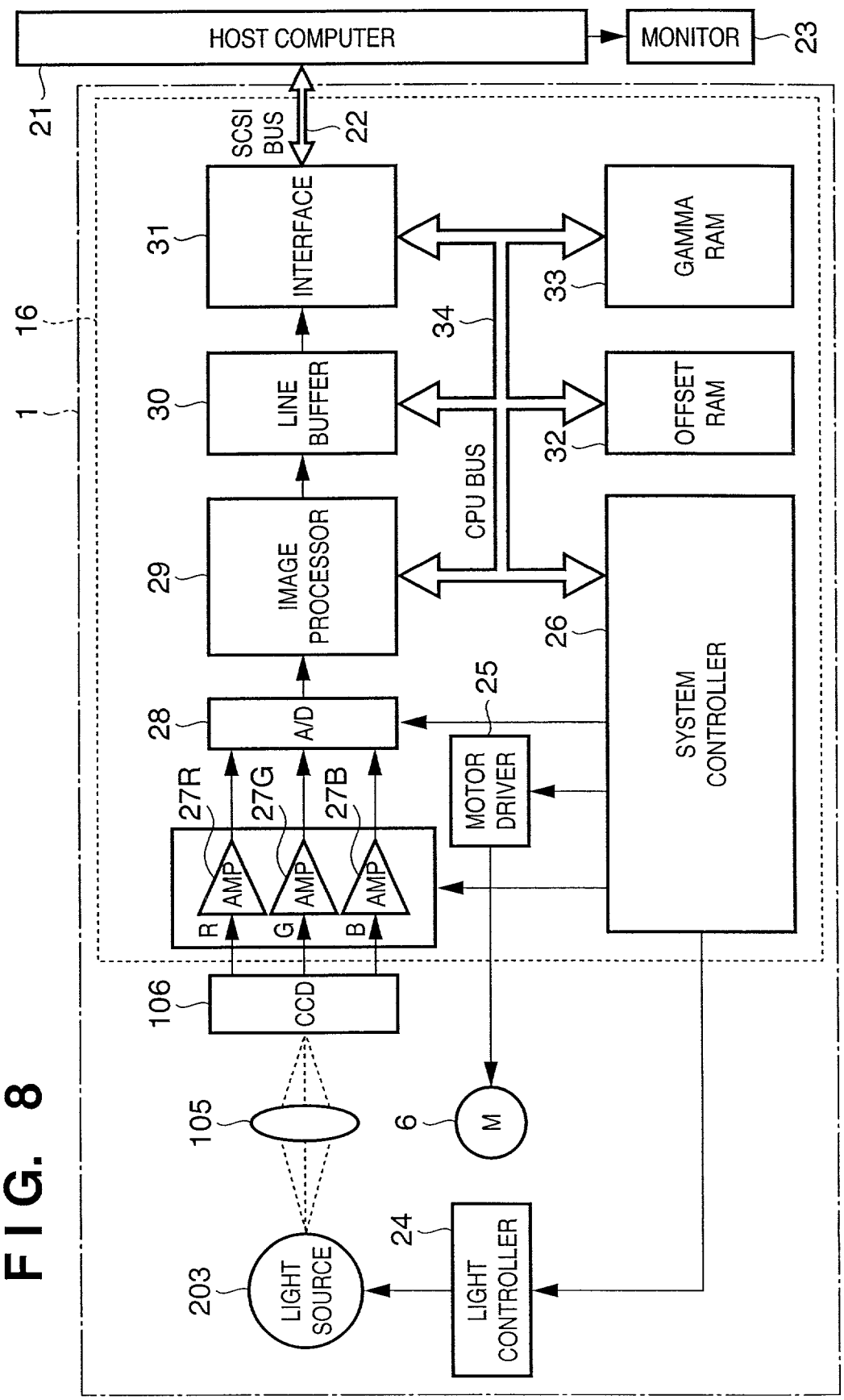
FIG. 8 is a block diagram showing the arrangement of an image reading apparatus according to the second embodiment.

The internal block arrangement of the image reading apparatus in the second embodiment shown in FIG. 8 is the same as that of the image reading apparatus in the first embodiment shown in FIG. 2 except for a light source 203, and a repetitive description thereof will be omitted.

Figure 9:
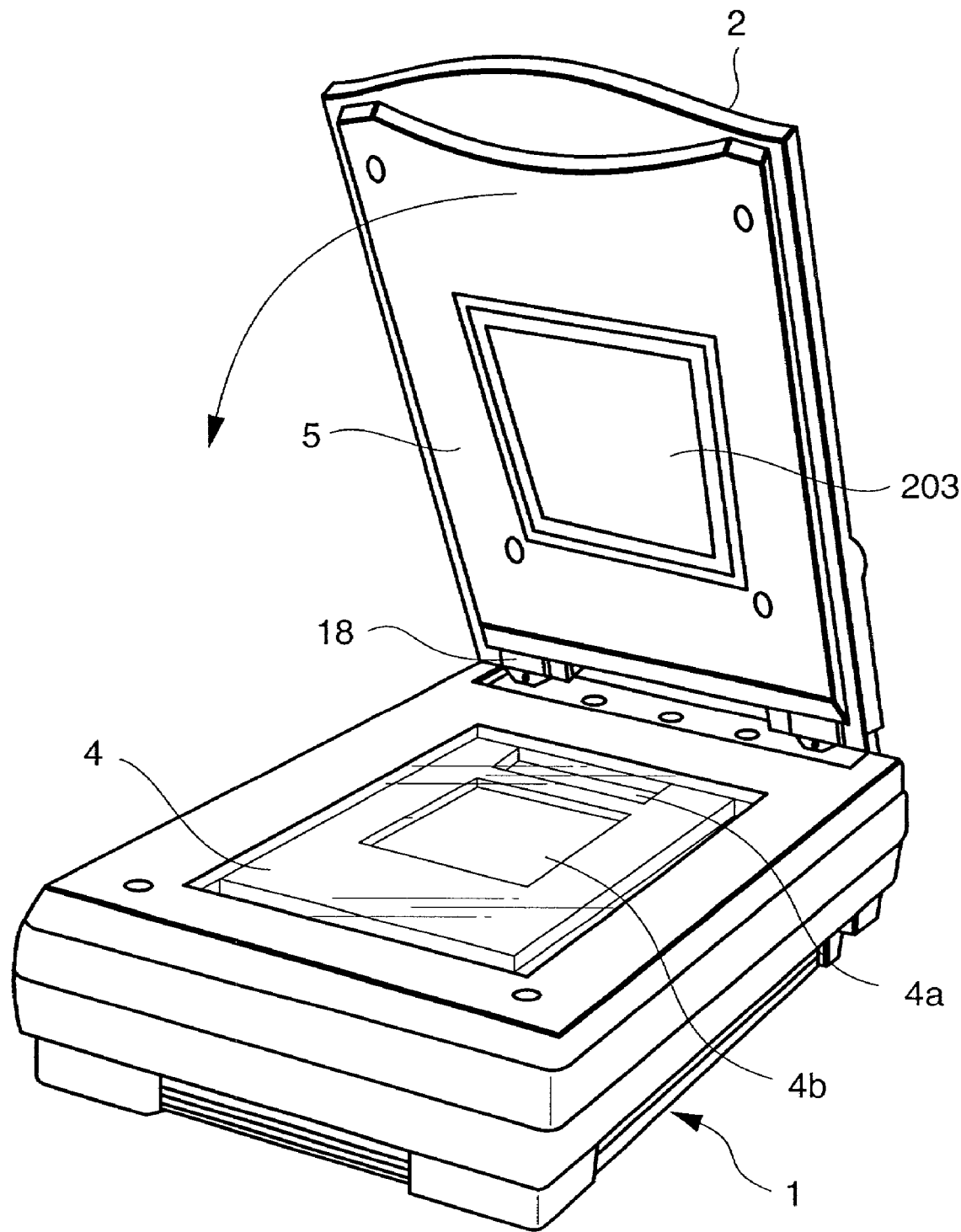
FIG. 9 is a schematic perspective view showing the image reading apparatus according to the second embodiment.

FIG. 9 is a schematic perspective view showing the image reading apparatus according to the second embodiment. The arrangement shown in FIG. 9 is also the same as the first embodiment shown in FIG. 3 except for the light source 203, and a description thereof will be omitted.

Figure 10:
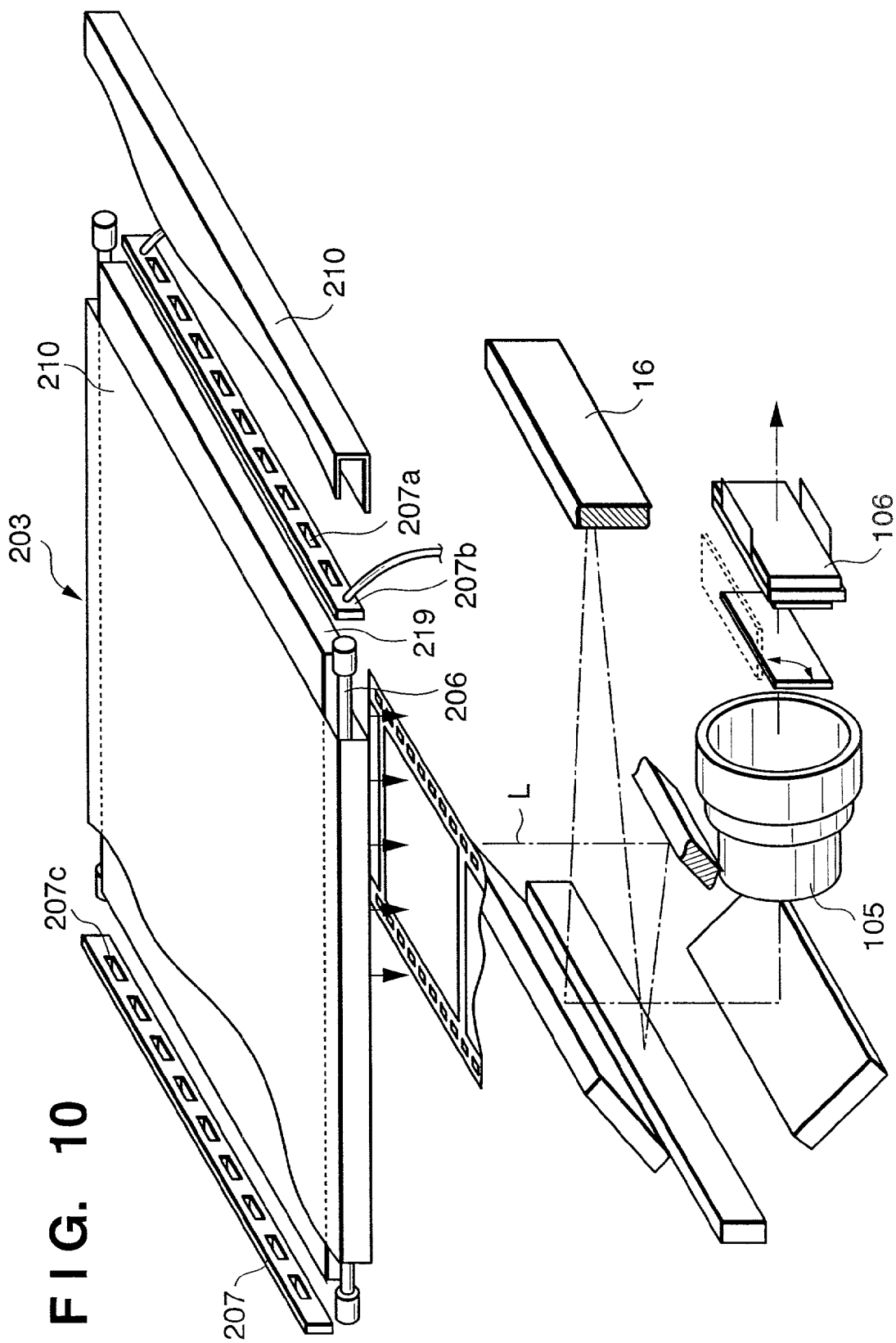
FIG. 10 is a schematic perspective view showing a transmission illumination unit according to the second embodiment.
Figure 11:
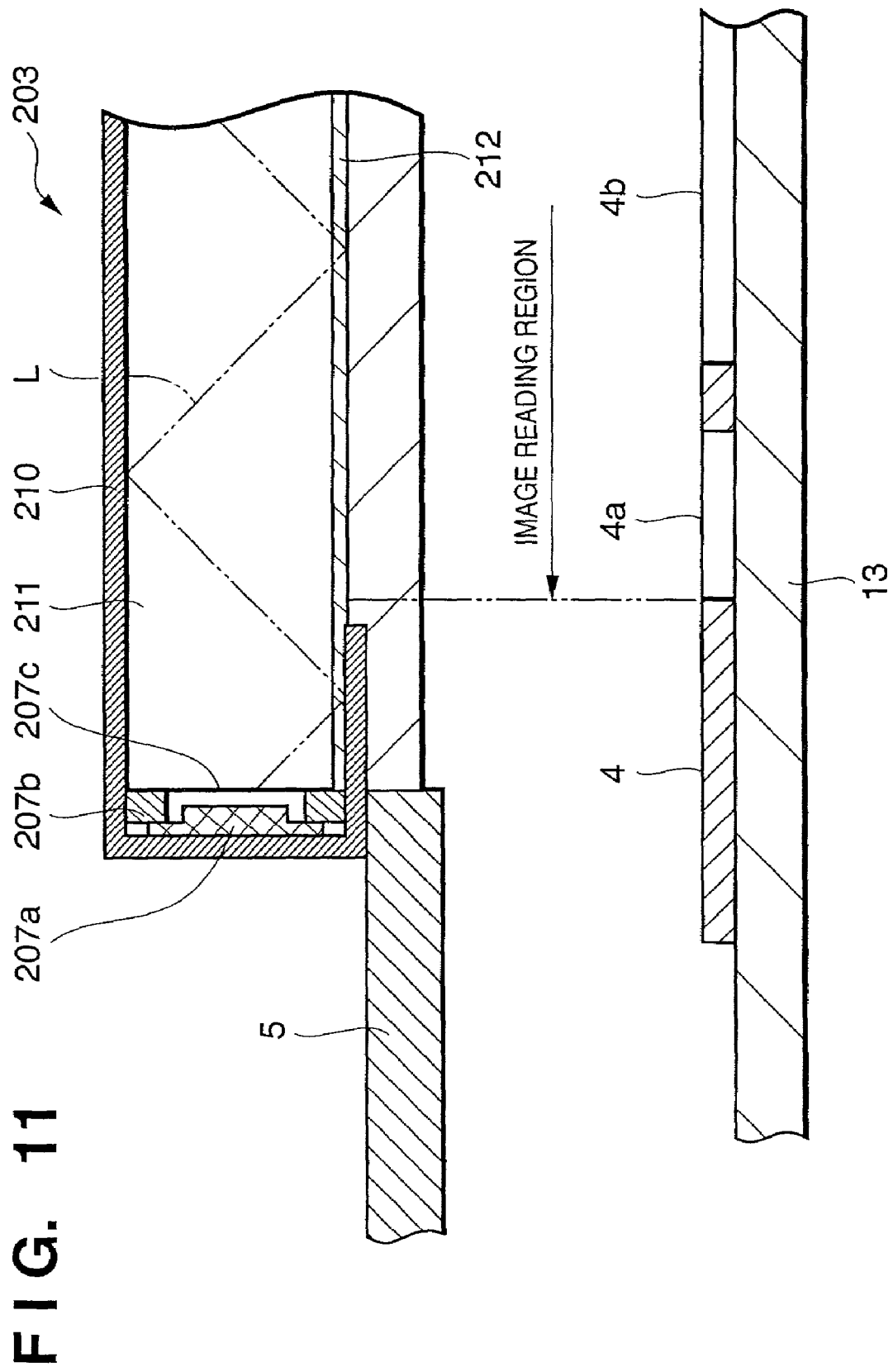
FIG. 11 is a schematic sectional view showing the transmission illumination unit according to the second embodiment.

FIG. 10 is a schematic perspective view showing a transmission illumination unit 2 according to the second embodiment. FIG. 11 is a sectional view showing the surface light source 203. The surface light source 203 is constructed by a light guide plate 219, transparent original reading lamps 206 such as fluorescent tubes or xenon lamps, and dust/scratch detection LED substrates 207 having an emission intensity in only the infrared region. The transparent original reading lamps 206 and dust/scratch detection LED substrates 207 are arranged on different sides of the light guide plate 219 perpendicular to each other.

Each dust/scratch detection LED substrate 207 is formed from a plurality of infrared LED chips 207a and an LED substrate 207b having light-emitting apertures 207c at positions corresponding to the infrared LED chips 207a. The infrared LED chip 207a is arranged such that the light-emitting portion of the infrared LED chip 207a is fit in the light-emitting aperture 207c of the LED substrate 207b from a side opposite to the light guide facing surface of the LED substrate 207b. The light guide facing surface of the LED substrate 207b is flat. The light guide facing surface of the LED substrate 207b is printed in white, which allows efficiently reflecting light. This can increase the luminance of the entire surface light source 203.

Each dust/scratch detection LED substrate 207 is tightly fixed to an end face of the light guide plate 219 by covering the substrate 207 with a reflecting sheet 210 bent at predetermined positions of the light guide 219, as shown in FIG. 11. Infrared rays can be efficiently guided to the light guide.

The light guide plate 219 is a resin light guide diffusion panel constituted by a light guide portion 211 for guiding illumination light L in the two-dimensional longitudinal direction by internal reflection, the reflecting sheet 210 for reflecting in the original direction the light guided by the light guide portion 211, and a diffusion sheet 212 for making the light reflected by the reflecting sheet 210 uniform.

Light L emitted by the transparent original reading lamps 206 and dust/scratch detection LED substrates 207 propagates through the light guide portion 211 in the two-dimensional longitudinal direction while being reflected between the reflecting sheet 210 and the diffusion sheet 212. Part of the light incident on the diffusion sheet 212 diffuses, and the entire surface of the light guide plate 219 emits light.

The reflecting sheet 210 at the end of the light-emitting surface of the light guide is extended close to the image reading region so as to prevent light from the LED from directly entering the image reading region. The entire surface of the light guide 219 can more uniformly emit light.

Figure 12:
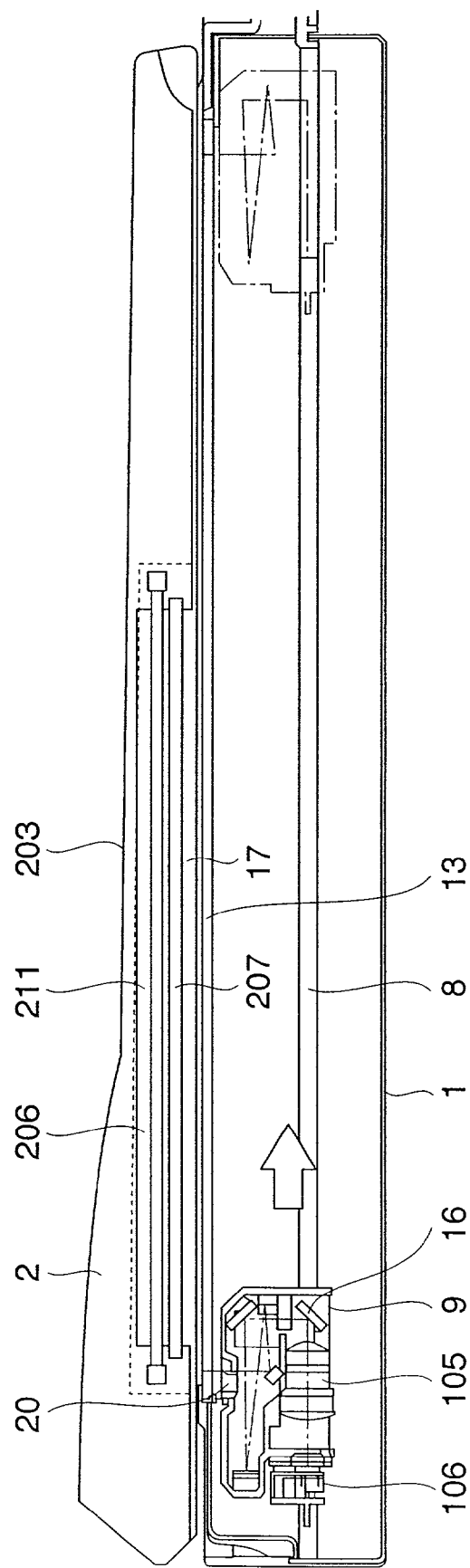
FIG. 12 is a schematic sectional view showing the transmission illumination unit according to the second embodiment.

FIG. 12 is a sectional view showing the image reading apparatus according to the second embodiment. A carriage 9 of an image reading apparatus 1 supports a reflecting original illumination lamp 20, a CCD line sensor 106, a lens 105, and a reflecting mirror 16. The CCD line sensor 106 converts an image into an electrical image signal and is constituted by a plurality of aligned image sensing elements. The carriage 9 is fit on a carriage guide shaft 8 and is movable in the subscanning direction.

Transparent original reading operation will be described.

The reflecting original illumination lamp 20 and dust/scratch detection LED substrates 207 are turned off, and the transparent original lamps 206 are turned on. Then, the whole surface light source 203 emits light. The carriage 9 is moved in the subscanning direction to project image information on a transparent original onto the CCD 106 via the reflecting mirror 16 and lens 105.

The reflecting original illumination lamp 20 and transparent original illumination lamps 206 are turned off, and the dust/scratch detection LED substrates are turned on. Then, the whole surface light source 3 emits light. The carriage 9 is moved in the subscanning direction to project dust, a scratch, or the like on the transparent original onto the CCD 106 via the reflecting mirror 16 and lens 105. Since light from the dust/scratch detection LED substrate contains only infrared components, the transparent original such as a negative or positive film transmits the infrared components regardless of the image (photosensitive image). An image of dust, a scratch, or the like which physically intercepts the optical path is projected as a shadow on the CCD 106. The dust or scratch can be accurately detected.

Both the dust/scratch detection image and the read image of the transparent original undergo image processing. The defective region having the dust or scratch recognized on the dust/scratch detection image is interpolated from the ambient original-read image. A high-quality transparent original image free from the influence of the dust or scratch can be read.

Although the invisible light source emits infrared rays in the above description, the use of ultraviolet rays enables processing an image in the ultraviolet region. The present invention is not limited to a transparent original reading apparatus, but can also be applied to a reflecting original reading apparatus.

As described above, the second embodiment can implement a high-efficiency surface illumination apparatus. The image reading apparatus using the surface light source can obtain a high-quality read image free from any dust or scratches.

The present invention is not limited to the above embodiments and various changes and modifications can be made within the spirit and scope of the present invention. Therefore, to apprise the public of the scope of the present invention the following claims are made.

What is claimed is:

1. An image reading apparatus characterized by comprising:
   a first light source that emits light in a visible region;
   a second light source that emits light in an invisible region;
   a light guide plate which has said first and second light sources arranged at end faces, and has a first light guide pattern for guiding light emitted by said first light source to an entire light-emitting surface and a second light guide pattern for guiding light emitted by said second light source to the entire light-emitting surface; and
   a reading device that converts light from an original illuminated by light which is emitted by said first or second light source and guided by said light guide plate into an image signal.

2. The apparatus according to claim 1, characterized in that defect information present on an optical path extending from said light guide plate to a solid-state image sensing element is read on the basis of the image signal obtained when the light from the original illuminated by the light which is emitted by said second light source and guided by said light guide plate enters a reading means.

3. The apparatus according to claim 2, characterized in that the defect information includes information generated when dust or a scratch present on the original itself intercepts the light which is emitted by said second light source and guided by said light guide plate.

4. The apparatus according to claim 1, characterized in that said light guide has said first light guide pattern formed from a plurality of grooves extending in a direction perpendicular to said first light source on a surface of said light guide, and said second light guide pattern formed by a plurality of grooves extending in a direction perpendicular to said second light source.

5. The apparatus according to claim 1, characterized in that said first light source is arranged at an end face of said light guide along a long side, and said second light source is arranged at an end face of said light guide along a short side.

6. The apparatus according to claim 1, characterized in that said second light source emits light in an infrared region.

7. An illumination apparatus characterized by comprising:
   a first light source that emits light in a visible region; a second light source that emits light in an invisible region; and a light guide plate which has said first and second light sources arranged at end faces, and has a first light guide pattern for guiding light emitted by said first light source to an entire light-emitting surface and a second light guide pattern for guiding light emitted by said second light source to the entire light-emitting surface.

8. The apparatus according to claim 7, characterized in that said light guide has said first light guide pattern formed from a plurality of grooves extending in a direction perpendicular to said first light source on a surface of said light guide, and said second light guide pattern formed by a plurality of grooves extending in a direction perpendicular to said second light source.

9. The apparatus according to claim 7, characterized in that said first light source is arranged at an end face of said light guide along a long side, and said second light source is arranged at an end face of said light guide along a short side.

10. The apparatus according to claim 7, characterized in that said second light source emits light in an infrared region.

11. The apparatus according to claim 7, characterized in that the illumination apparatus is used in an image reading apparatus for forming light from the original into an image on a solid-state image sensing element via an imaging optical system, and reading image information of the original.

12. An image reading apparatus characterized by comprising:
    a first light source that emits light in a visible region;
    a second light source constituted by aligning on a light-emitting element substrate a plurality of light-emitting elements for emitting light in an invisible region;
    a light guide plate that guides light beams emitted by said first and second light sources through a surface to illuminate an original;
    a reading device that converts light from the original illuminated by light which is emitted by said first or second light source and guided by said light guide plate into an image signal; and
    a light guide surface side of the light-emitting element substrate except for light-emitting apertures reflects light.

13. The apparatus according to claim 12, characterized in that defect information present on an optical path extending from said light guide plate to a solid-state image sensing element is read on the basis of the image signal obtained when the light from the original illuminated by the light which is emitted by said second light source and guided by said light guide plate enters said reading means.

14. The apparatus according to claim 12, characterized in that the defect information includes information generated when dust or a scratch present on the original itself intercepts the light which is emitted by said second light source and guided by said light guide plate.

15. The apparatus according to claim 12, characterized in that said second light source has a plurality of light-emitting apertures formed in the light-emitting element substrate in correspondence with the light-emitting elements, the light-emitting elements are so arranged as to bury light-emitting portions of the light-emitting elements in the substrate with a pattern surface facing a side opposite to a light guide surface side, and the light-emitting element substrate and an end face of said light guide are arranged in tight contact with each other.

16. The apparatus according to claim 12, characterized in that the light-emitting element substrate is covered with a reflecting member so as to be arranged in tight contact with said light guide.

17. The apparatus according to claim 16, characterized in that an end of the reflecting member on a light-emitting surface side of said light guide is arranged near an image reading region.

18. The apparatus according to claim 12, characterized in that said second light source emits light in an infrared region.

19. An image illumination apparatus characterized by comprising:
  a first light source that emits light in a visible region;
  a second light source constituted by aligning on a light-emitting element substrate a plurality of light-emitting elements for emitting light in an invisible region;
  a light guide plate which has said first and second light sources arranged at end faces, and guides incident light beams from the end faces through a surface to substantially uniformly emit Light; and
  a light guide surface side of the light-emitting element substrate except for light-emitting apertures reflects light.

20. The apparatus according to claim 19, characterized in that the light-emitting element substrate is covered with a reflecting member so as to be arranged in tight contact with said light guide.

21. The apparatus according to claim 20, characterized in that an end of the reflecting member on a light-emitting surface side of said light guide is arranged near an image reading region.

22. The apparatus according to claim 19, characterized in that said second light source emits light in an infrared region.

23. The apparatus according to claim 19, characterized in that the illumination apparatus is used in an image reading apparatus for forming light from the original into an image on a solid-state image sensing element via an imaging optical system, and reading image information of the original.

* * * * *